(12) United States Patent
Dawson (10) Patent No.: US 7,348,968 B2
(45) Date of Patent: Mar. 25, 2008

(54) WIRELESS FORCE FEEDBACK INPUT DEVICE (75) Inventor: Thomas Patrick Dawson, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 736 days.

(21) Appl. No.: 10/726,850

(22) Filed: Dec. 2, 2003

(65) Prior Publication Data
US 2005/0116940 A1 Jun. 2, 2005

(51) Int. Cl.
G09G 5/00 (2006.01)

(52) U.S. Cl. ........................................ 345/179; 345/157

(58) Field of Classification Search ........ 345/156–170, 345/174–175, 179–183; 178/18.01, 19.01, 178/19.03, 19.05; 341/20, 27, 30; 364/709.01
See application file for complete search history.

(56) References Cited

U.S. PATENT DOCUMENTS

| | | | |
|---|---|---|---|
| 5,576,727 | A | 11/1996 | Rosenberg et al. |
| 6,088,020 | A | 7/2000 | Mor |
| 6,184,868 | B1 | 2/2001 | Shahoian et al. |
| 6,211,861 | B1 | 4/2001 | Rosenberg et al. |
| 6,281,651 | B1 | 8/2001 | Haanpaa et al. |
| 6,396,232 | B2 | 5/2002 | Haanpaa et al. |
| 6,448,977 | B1 | 9/2002 | Braun et al. |
| 6,469,692 | B2 | 10/2002 | Rosenberg |
| 6,580,417 | B2 | 6/2003 | Rosenberg et al. |
| 6,592,039 | B1 * | 7/2003 | Smith et al. ........... 235/462.49 |
| 6,636,161 | B2 | 10/2003 | Rosenberg |
| 6,650,338 | B1 | 11/2003 | Kolarov et al. |
| 2002/0097223 | A1 * | 7/2002 | Rosenberg .................. 345/157 |
| 2002/0158842 | A1 * | 10/2002 | Guy et al. .................. 345/156 |
| 2003/0058216 | A1 * | 3/2003 | Lacroix et al. ............. 345/156 |
| 2003/0159141 | A1 | 8/2003 | Zacharias |
| 2005/0110778 | A1 * | 5/2005 | Ben Ayed .................... 345/179 |
| 2007/0014490 | A1 * | 1/2007 | Silverbrook et al. ........ 382/313 |

OTHER PUBLICATIONS www.sensable.com—Sensable Technologies.
http://home-3.12move.nl/~sh290334/dbase_force/.
http://www.sensibletechnologies.com/—Sensible Technologies, Inc.

* cited by examiner

Primary Examiner—Richard Hjerpe
Assistant Examiner—Mansour M. Said
(74) Attorney, Agent, or Firm—Steven L. Nichols; Rader, Fishman & Grauer PLLC (57) ABSTRACT

A wireless force feedback device includes a housing, a central processing unit (CPU) disposed in the housing, a wireless communication receiver disposed in the housing and communicatively coupled to the CPU, wherein the wireless communication receiver is configured to receive haptic commands from a host computing device, and an actuator communicatively coupled to the central processing unit, wherein the actuator is configured to produce a haptic sensation, the haptic sensation being controlled by the CPU in response to haptic commands.

44 Claims, 6 Drawing Sheets

WIRELESS FORCE FEEDBACK INPUT DEVICE

BACKGROUND

Humans interface with electronic and mechanical devices in a variety of applications and the need for a more natural, easy-to-use, and informative interface is a constant concern. For example, a user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is physically connected to the computer system controlling the displayed environment. Typically, the computer updates the displayed environment in response to a user's manipulation of a physical input device such as a joystick handle or a mouse, and provides visual and audio feedback to the user utilizing the display screen and audio speakers.

However, many artists and designers fault the lack of tactile feedback or haptic response in input devices for interacting with computer systems. For example, when drawing on various types of paper, an artist can feel the texture of the surface through the pen or brush they are using. They can feel the stiffness of a brush's bristles and also have a tactile feel for how much paint the brush holds. In contrast, a computer based graphics design system using a mouse or a tablet and a stylus traditionally provide no tactile or haptic feedback to the user.

SUMMARY

A wireless force feedback device includes a housing, a central processing unit (CPU) disposed in the housing, a wireless communication receiver disposed in the housing and communicatively coupled to the CPU, wherein the wireless communication receiver is configured to receive haptic commands from a host computing device, and an actuator communicatively coupled to the central processing unit, wherein the actuator is configured to produce a haptic sensation, the haptic sensation being controlled by the CPU in response to the haptic commands.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The present specification discloses exemplary systems and methods for providing a wireless force feedback input device. More particularly, according to one exemplary embodiment, a stylus or other data input device is configured with a wireless receiver for receiving haptic control signals, a central processing unit (CPU) for processing received wireless signals, and an actuator for providing a desired haptic response. Both the structure and the implementation of the present system and method will be disclosed in detail below.

As used in the present specification and in the appended claims, the term "haptic" is meant to be understood broadly to include any sensation relating to or proceeding from the sense of touch. Additionally, the term "wireless" is meant to refer to communication without cables or cords, chiefly using radio frequency and/or infrared signals. The term "tablet" is meant to be understood broadly as including any electronic interface used to communicate with a computing device, wherein the electronic interface includes a contact and motion sensing interface. The term "stylus" or "pen" is meant to be understood broadly both here and in the appended claims to mean any input device used to write text, draw lines, or enter data on a surface as an input to a computing device.

In the following description, for purposes of explanation, numerous specific details are set forth in order to provide a thorough understanding of the present system and method for providing a wireless force feedback input device. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
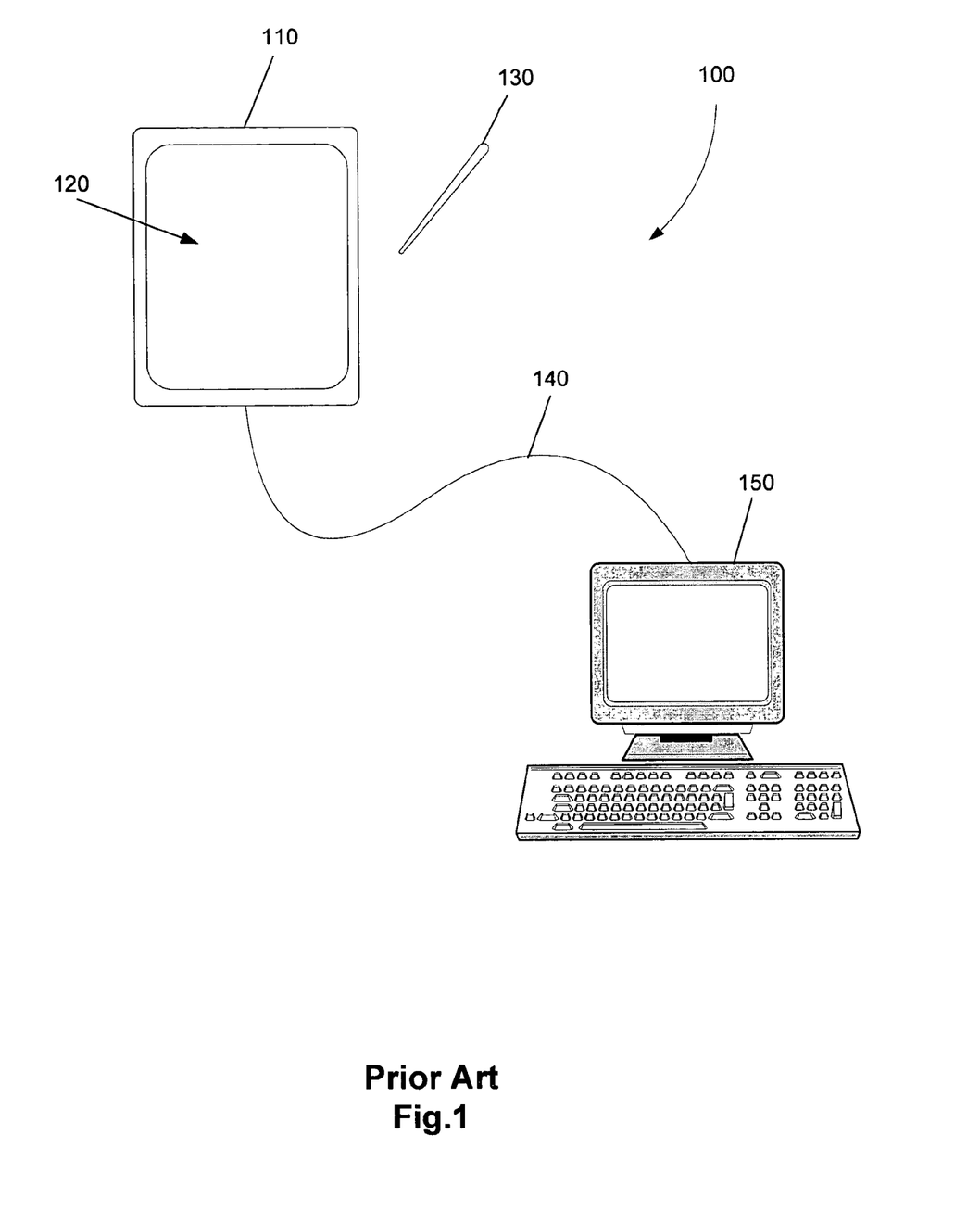
FIG. 1 is a simple block diagram illustrating a computer based input system according to one exemplary embodiment.

FIG. 1 illustrates a computerized paint system according to the prior art. As shown in FIG. 1, computerized paint systems (100) traditionally included a tablet (110) or other input device having a contact sensing surface (120). This tablet was traditionally configured to sense selective applications of contact made by a stylus (130) and convert those selective applications of contact into brush or cursor movements acknowledged by an application running on a host computing device (150). As shown in FIG. 1, the tablet was traditionally communicatively coupled to the host computing device (150) through a bus (140), cables, or other tangible communication means. By coupling the tablet (110) or other input device having a contact sensing surface (120) to the host computing device (150), selective applications of contact made by the stylus (130) could be tracked and recorded by the host computing device (150).

While the configuration illustrated in FIG. 1 does allow for a free range of motion by the stylus (130) when inputting information and movement commands onto the tablet (110) or other input device having a contact sensing surface (120), there has traditionally been no haptic response provided to the user. Traditionally the stylus (130) has been a selectively formed from piece of solid plastic or other material, structurally unable to provide any degree of baptic response.

Figure 2:
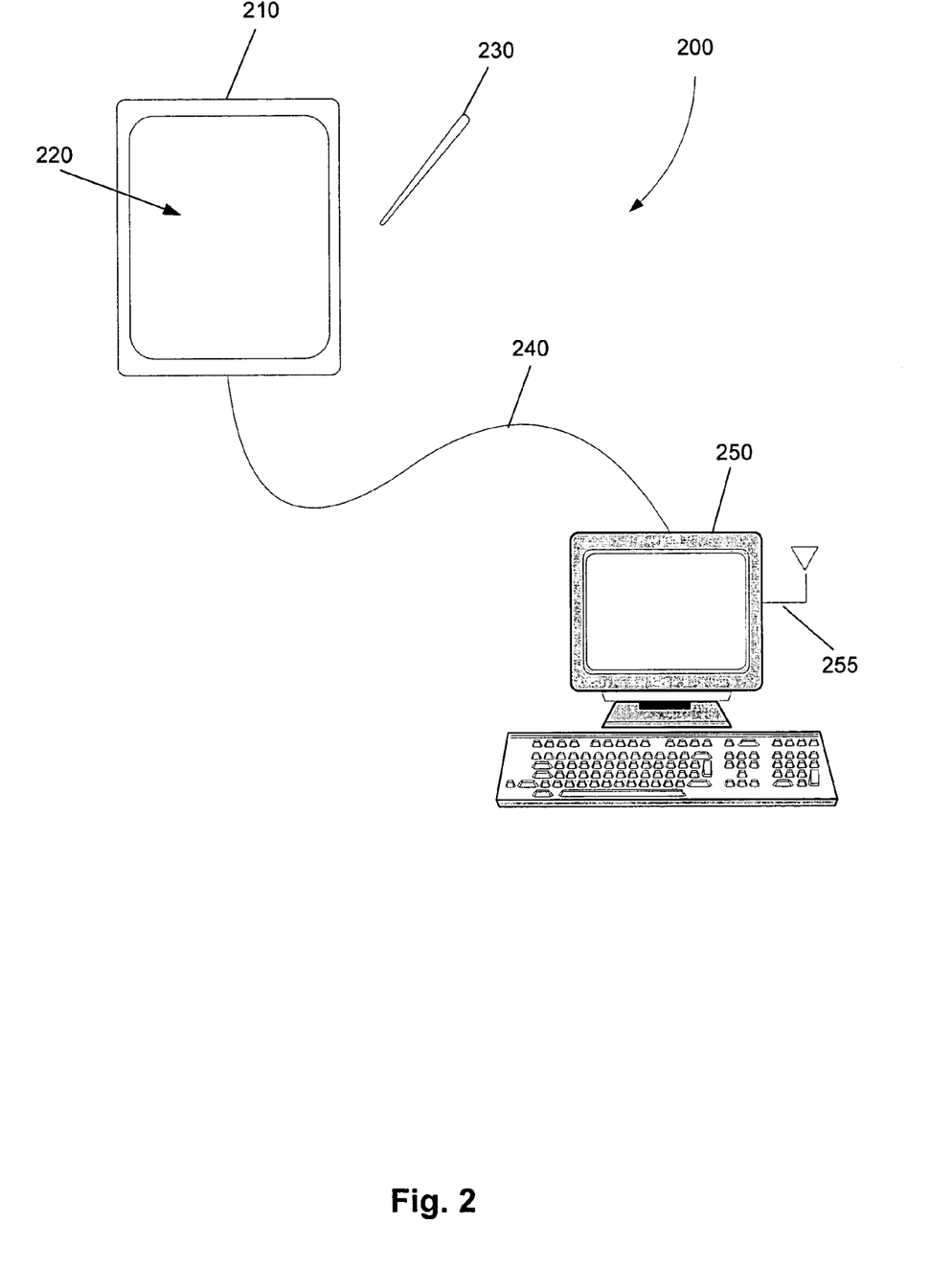
FIG. 2 is a simple block diagram illustrating a computer based input system incorporating the present system and method according to one exemplary embodiment.

In contrast to FIG. 1, FIG. 2 illustrates an exemplary system configured to provide a wireless force feedback sensation through the stylus (230) in response to events occurring in a program implemented by a host computing device (250). As shown in FIG. 2, the force feedback providing system (200) includes a tablet (210) or other input device having a contact sensing surface (220). Similar to the tablet illustrated in FIG. 1, the tablet of FIG. 2 is configured to sense selective applications of contact made by a stylus (230) and convert those selective applications of contact into brush or cursor actions. Also similar to the system illustrated in FIG. 1, the tablet (210) illustrated in FIG. 2 is communicatively coupled to a host computing device (250) through a communication link (240) to allow for the tracking and recording of pressure applications sensed by the tablet in the host computing device (150). However, in contrast to the host computing device (150) illustrated in FIG. 1, the host computing device illustrated in FIG. 2 further includes an antenna (255) and/or a transmitter (not shown) configured to communicate with the stylus (230).

The tablet (210) illustrated in FIG. 2 may be any data input device or interface that utilizes touch-screen technology. As shown in FIG. 2, the tablet (210) includes a contact sensing surface (220) that registers contact made by the stylus (230) and converts that registered contact into data that may be transmitted to and interpreted by the host computer system (250). The contact sensing surface of the tablet (210) may utilize any touch-screen method configured to accurately recognize contact and movement of the stylus (230). Touch screen methods that may be used by the contact sensing surface include, but are in no way limited to, resistive systems, capacitive systems, light emitting diode systems, or surface acoustic wave systems.

Figure 4:
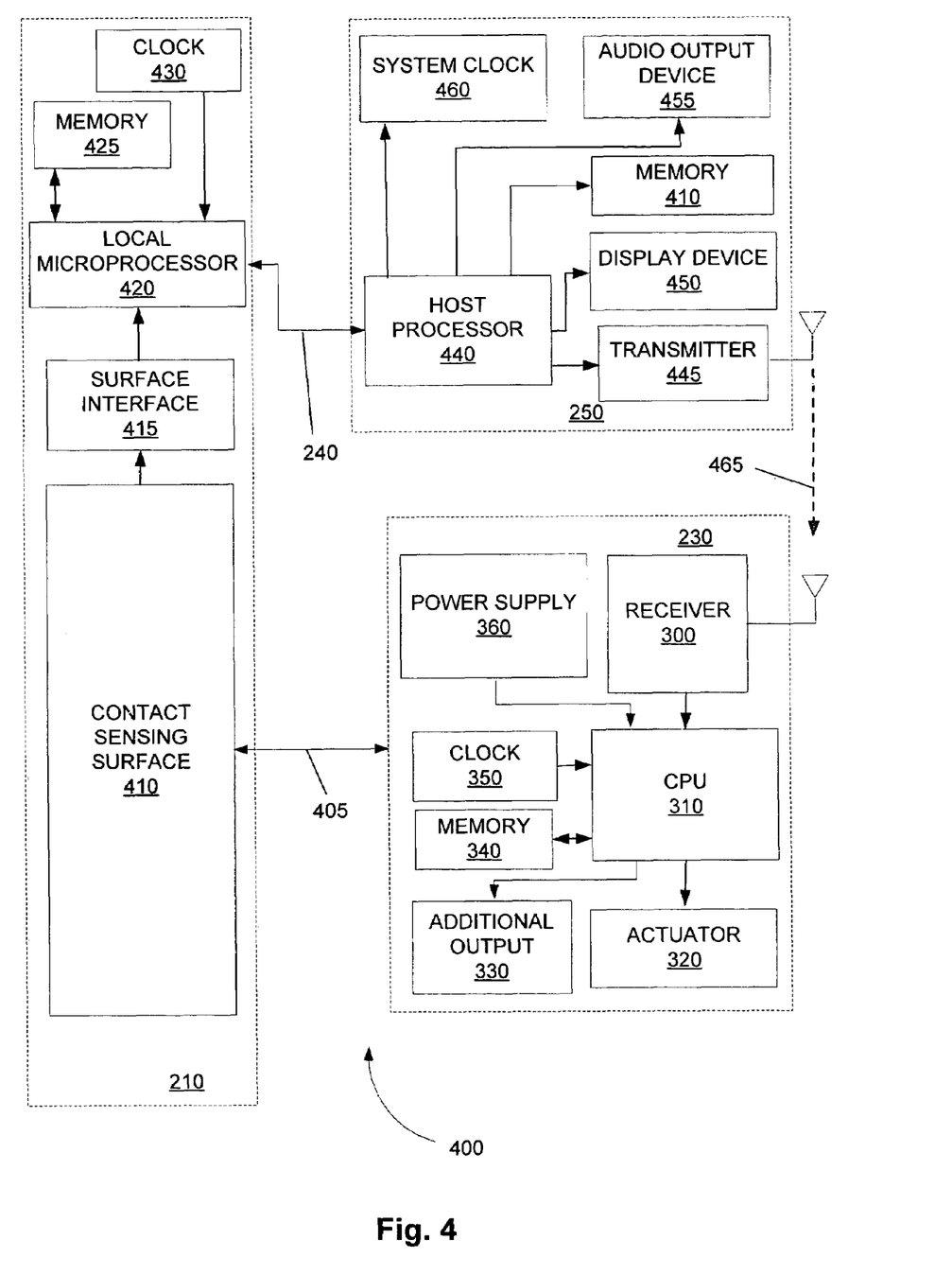
FIG. 4 is a system block diagram illustrating the internal components of a computer based input system according to one exemplary embodiment.

FIG. 4 further illustrates the components of the tablet (210). As shown in FIG. 4, the tablet may include a local microprocessor (420) coupled to the contact sensing surface (220) through an optional surface interface (415). Additionally, a memory (425) and a clock (430) may be communicatively coupled to the local microprocessor (420) as illustrated in FIG. 4.

During operation, any one of the afore-mentioned methods may be used by the contact sensing surface (220) to sense the position or motion of the stylus (230) and provide signals to the local microprocessor (420) which may then be manipulated and transmitted to the host computing system (250). The signals may be manipulated by the optional contact sensing surface interface (415), converting the contact signals into signals that can be interpreted by the local microprocessor (420) and/or host computer system (250).

Returning again to FIG. 2, the tablet (210) is communicatively coupled to the host computer system (250) by a bi-directional bus (240). The bi-directional bus (240) is configured to facilitate the transmission of signals in either direction between the host computer system (250) and the tablet (210). The bus (240) can be a serial interface bus, such as an RS232 serial interface, RS-422, Universal Serial Bus (USB), MIDI, or other protocols well known to those skilled in the art; a parallel bus; or a wireless link. While the tablet (210) and the host computer system (250) are illustrated in FIG. 2 as separate standalone components coupled through the bi-directional bus (240), the tablet (210) may alternatively be formed as an integral part of the host computer (250). According to this alternative embodiment, the tablet and the host computer may form a single functional unit such as a pocket PC or a laptop.

The host computer (250) illustrated in FIG. 2 may be any computing device including, but in no way limited to a personal computer or workstation. Moreover, the host computer (250) may operate under any number of operating systems including, but in no way limited to, WINDOWS, MacOS, Unix, or MS-DOS operating system. Alternatively, the host computer system (250) can be any one of a variety of home video game systems commonly connected to a television set, a "set top box," or a "network-" or "internet-computer" which allows users to interact with a local or global network using standard connections and protocols such as those used for the Internet and World Wide Web.

According to one exemplary embodiment illustrated in FIG. 2, the host computer system (250) is configured to implement a host application program with which a user is interacting via the stylus (230) and tablet (210). By way of example only, the host application program can be a simulation, a video game, a Web page or browser that implements HTML or VRML instructions, a scientific analysis program, a virtual reality training program or application, a paint or illustration program, a computer aided drafting (CAD) program or another application program that utilizes the input of a stylus (230) on a tablet (210) and outputs force feedback commands to the stylus (230).

As illustrated in FIG. 4, the host computer system (250) may also include a display device (450) including, but in no way limited to a standard display screen (LCD, CRT, flat panel, etc.), 3-D goggles, or any other visual output device. Typically, the host application provides images to be displayed on the display device (450) and/or other feedback, such as auditory signals. In one exemplary embodiment, an application program utilizes a graphical user interface (GUI) to present options to a user and receive input from the user. In the following description, the host computer system (250) may be referred to as displaying a number of "graphical objects" or "computer objects." These objects are not physical objects; rather they are logical software unit collections of data and/or procedures that may be displayed as images by a display of the host computer system (250). The program running on the host computer system checks for input signals received from the electronics and sensors of the tablet (210) due to contact by the stylus (230), and outputs force values and/or commands to be converted into forces to be output by the stylus (230).

As shown in FIG. 4, the present host computer system (250) also includes a transmitter (445). The transmitter (445) incorporated into the present host computer system (250) is configured to wirelessly communicate with the stylus (230). The transmitter may communicate commands corresponding to force producing outputs through any number of wireless methods including, but in no way limited to, radio frequency (RF) transmission or infrared (I/R) transmission. For ease of explanation only, the present embodiment of the force feedback providing system (400) will be explained within the context of a host computer system (250) configured to communicate with the stylus (230) through RF transmissions. In addition to the antenna (255; FIG. 2) and the transmitter (445), the host computer (250) may also include a host processor (440); memory (410) such as random access memory (RAM), and read only memory (ROM); input/output (I/O) circuitry; an audio output device (455) such as a speaker system; a system clock (460); and other computer components well-known to those skilled in the art.

Figure 3A:
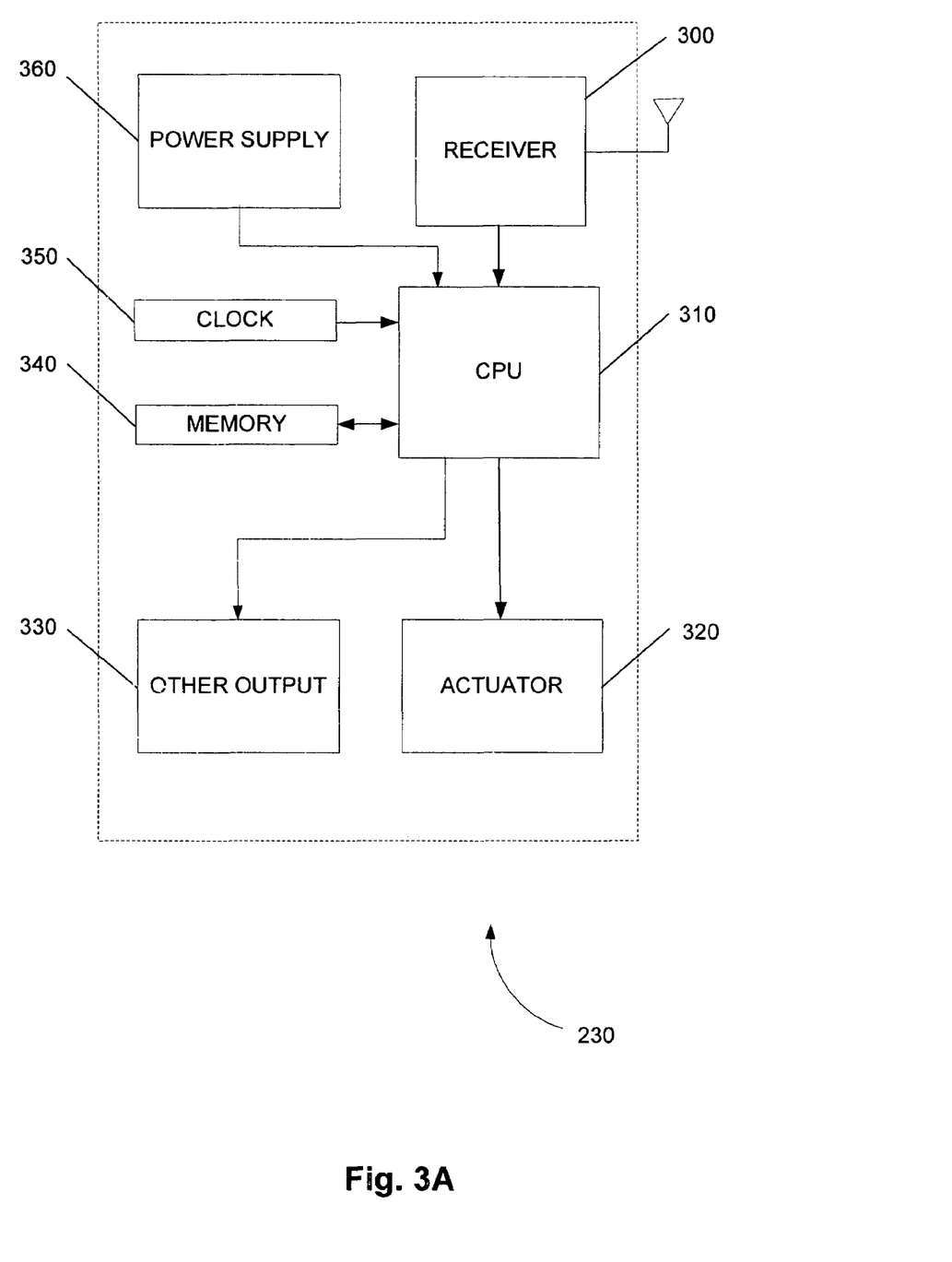
FIG. 3A is a simple block diagram illustrating the internal components of a wireless force feedback input device according to one exemplary embodiment.

Returning again to FIG. 2, the pen or stylus (230) is any device that may be configured to input information to the tablet (210) through selective contact, receive wireless commands from the host computer system (250), and provide force feedback sensations to a user in response to the commands from the host computer system. The pen or stylus (230) may assume any number of shapes. According to one exemplary embodiment, the stylus (230) assumes a cylindrical shape similar to a traditional ink pen. The individual components of the stylus according to one exemplary embodiment are illustrated in FIG. 3A. As shown in FIG. 3A, the stylus (230) includes a wireless signal receiver (300) communicatively coupled to a central processing unit or CPU (310) and a memory (340). Additionally, a small power supply (360) and an actuator (320) may be coupled to the CPU. According to one exemplary embodiment illustrated in FIG. 3A, an optional clock (350) and an additional output (330) may also be coupled to the CPU (310).

The small wireless receiver (300) located within the stylus (230) may be any receiver configured to acknowledge and accept the wireless signals being transmitted from the host computer system (250). The wireless receiver (300) may be configured to receive any number of signals including, but in no way limited to, RF and I/R signals.

Once received by the receiver, the wireless signals are transmitted to the CPU (310) of the present stylus (230) where they are converted to commands to be sent to the actuator (320). The CPU (310) of the stylus (230) may be any processing device such as a processor, a microprocessor, or an application-specific integrated circuit (ASIC). The CPU (310) of the stylus (230) is configured to receive and decode the commands transmitted by the host computing device (250), and control input and output signals according to the commands. Additionally, the CPU (310) of the stylus (230) may control the coupled actuator (320) in response to the received commands. Local memory (340), such as RAM and/or ROM, may be coupled to the CPU (310) to store instructions for the CPU (310) as well as to store temporary and other data such as force profiles or a look-up table of force values to be output based on the received command. Additionally, an optional local clock (350) can be coupled to the CPU (310) to provide timing data. The timing data may be used for such things as computing forces output by the actuator (320) (e.g., forces dependent on calculated velocities or other time dependent factors).

The actuator (320) that provides the haptic sensations in the stylus (230) is configured to generate "informative" or "effect" forces that do not resist or assist motion of the stylus. The actuator (320) may be any electromechanical device configured to provide haptic feedback to a user. The actuator may include, but is in no way limited to, a linear actuator, a repulsive magnet pair, a mechanical spring, or a rotary actuator that outputs a rotational force (torque).

Figure 3B:
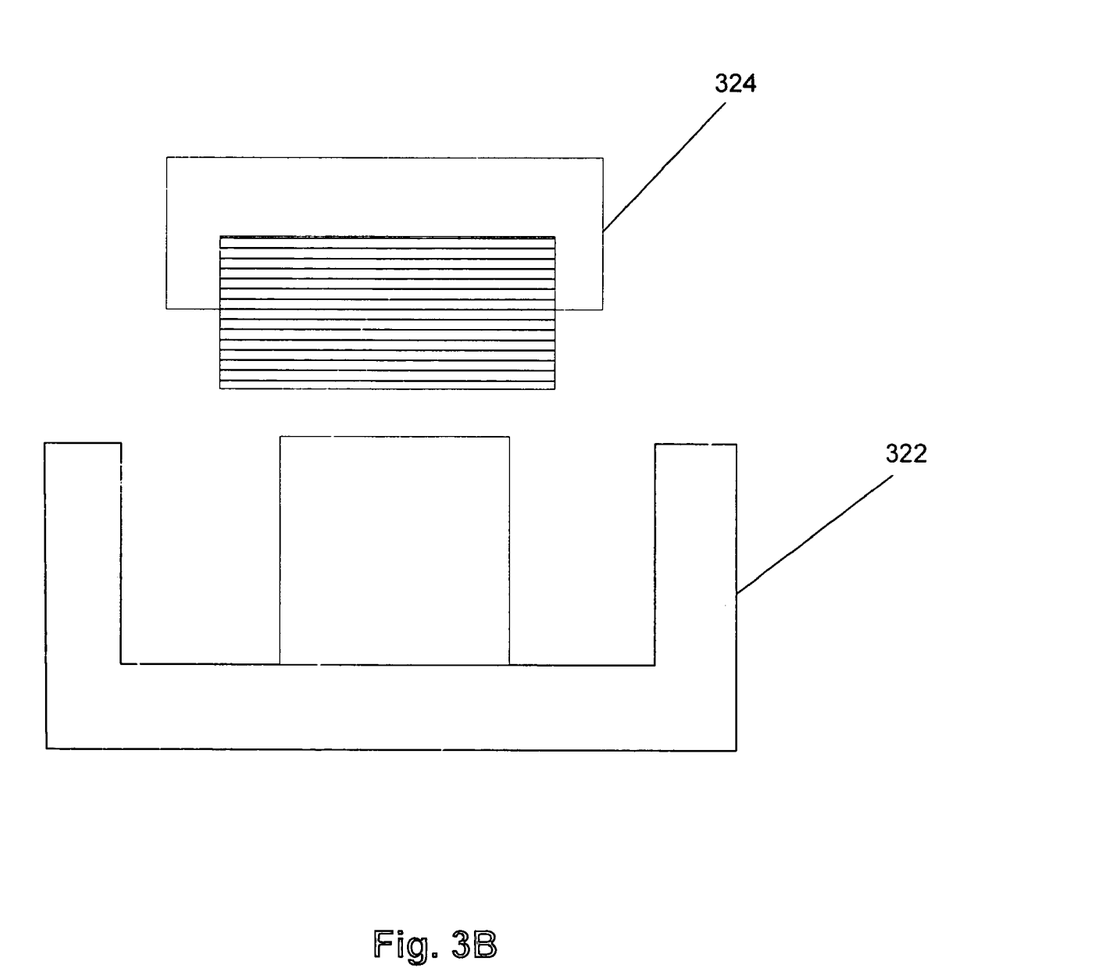
FIG. 3B is a simple block diagram illustrating a linear actuator according to one exemplary embodiment.

According to one exemplary embodiment illustrated in FIG. 3B, the actuator (320) is a linear voice coil actuator that includes a stationary magnet portion (322) and a moveable bobbin (324). As shown in FIG. 3B, the stationary magnet portion (322) is grounded and the bobbin (324) is moved relative to the magnet portion. Alternatively, the bobbin (324) may be grounded and the magnet portion (322) can be moved. The magnet portion (322) includes a housing made of a metal such as steel. A magnet is provided within the housing and a pole piece is positioned on the magnet. During operation, the magnet provides a magnetic field in response to a signal that uses the metal housing as a flux return path. The pole piece focuses the flux into the gap between the pole piece and the housing. According to one exemplary embodiment, the housing, the magnet portion, and the bobbin are cylindrically shaped to conform to the cylindrical shape of the stylus (230).

The bobbin (324) is configured to move linearly with respect to the magnet portion (322) and includes a support member and a coil attached to the support member. The coil is preferably wound about the support member in successive loops. When the bobbin is moved, the coil is moved through the magnetic field causing an electric current to flow through the coil via electrical connections. As is well known to those skilled in the art, the electric current in the coil generates a magnetic field. The magnetic field from the coil then interacts with the magnetic field generated by the magnet (322) to produce a force. The magnitude or strength of the force is dependent on the magnitude of the current that is applied to the coil and the strength of the magnetic field. Likewise, the direction of the force depends on the direction of the current in the coil.

Returning again to FIG. 3A, a power supply (360) is included in the stylus (230) to provide electrical power to the components and to facilitate operation of the actuator (320). According to one exemplary embodiment, a number of small rechargeable batteries are coupled to the components of the stylus (230) and provide power thereto.

In addition to the components previously mentioned, the stylus (230) may also include an additional output (330) coupled to the CPU (310). The additional output may include, but is in no way limited to, a light, a power input connector, or an ink pen option. Possible applications of the additional output (330) are described in further detail below with reference to possible alternative embodiments.

FIG. 4 further illustrates the components of the present exemplary system configured to provide a wireless force feedback through the stylus (230). As shown in FIG. 4, the tablet (210) and the host computer system (250) are communicatively coupled through the bi-directional bus (240). In contrast, the tablet (210) and the stylus (230) are only communicatively coupled when the stylus contacts (405) the contact sensing surface of the tablet. Moreover, the host computer system (250) and the stylus (230) are communicatively coupled through the wireless transmitter (445) and the wireless receiver (300). Using the exemplary configuration illustrated in FIG. 4, the wireless stylus (230) may be configured to provide haptic feedback to a user.

Exemplary Implementation and Operation

Figure 5:
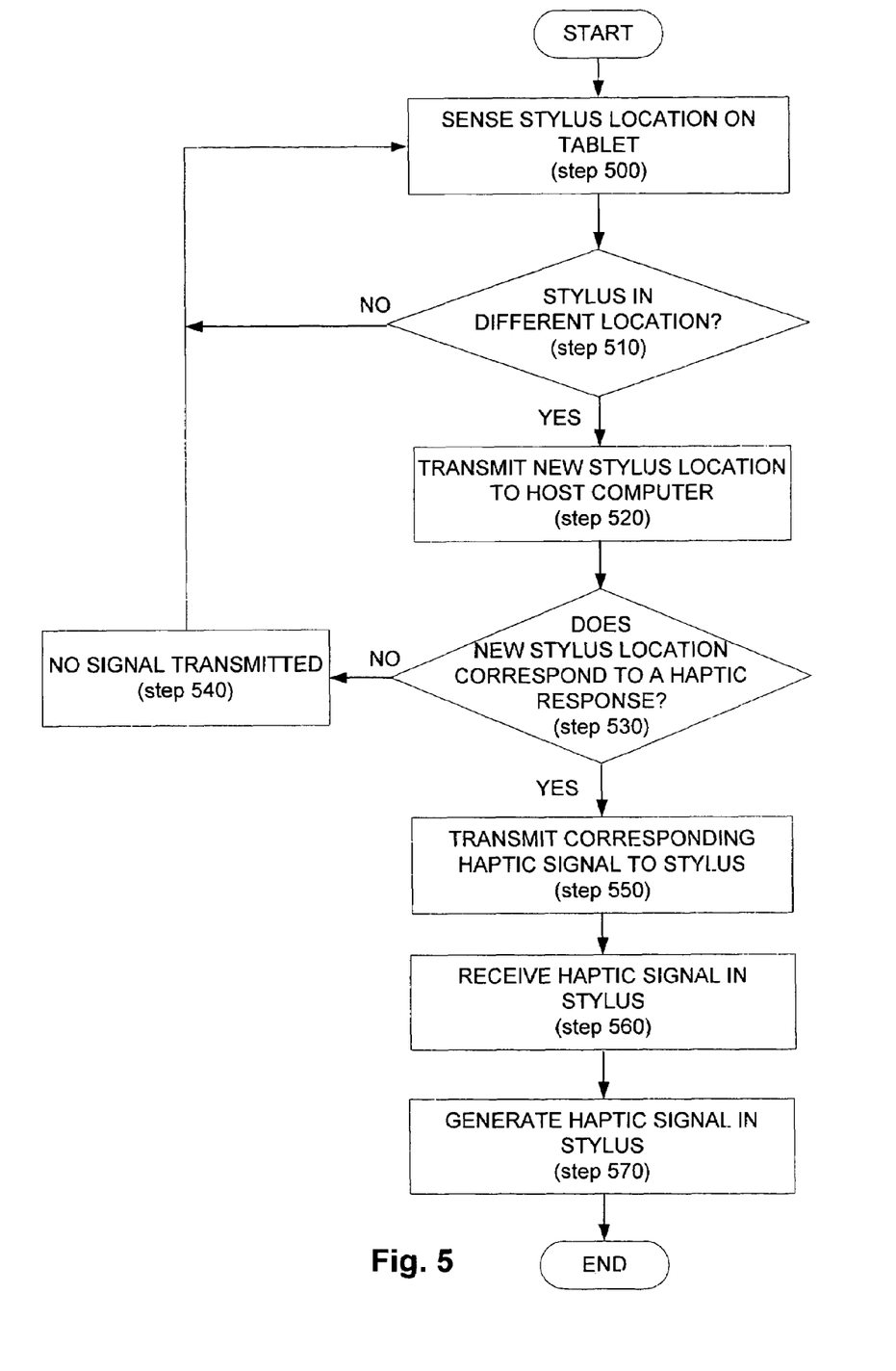
FIG. 5 is a flow chart illustrating a method for providing haptic feedback according to one exemplary embodiment.

FIG. 5 illustrates a method for providing and operating a wireless force feedback input device according to one exemplary embodiment. As shown in FIG. 5, the exemplary method begins by first determining the location of the stylus contacting the tablet (step 500). Once the location of the stylus with respect to the tablet is determined, the system determines whether the stylus is in a different location than it was when previously located (step 510). If the stylus has not moved (NO, step 510), another location inquiry is performed (step 500). If, however, the stylus is located in a different location (YES, step 510), the tablet communicates the new stylus location to the host computing device (step 520). Once the new stylus location is communicated to the host computing device, the host computing device determines whether the new stylus location corresponds to a location meriting a haptic response (step 530). If the new location of the stylus does not merit a haptic response (NO, step 530), no signal is transmitted from the host computing device to the stylus (step 540). If, however, the new stylus location does correspond to a location meriting a haptic response (YES, step 530), the host computing device transmits a command signal corresponding to a haptic response to the stylus (step 550). The command signal is then received by the stylus (step 560) and used to generate a haptic signal in the stylus (step 570). The above-mentioned method will now be described in further detail below with reference to FIG. 4.

As shown in FIG. 5, the present exemplary method begins by sensing the stylus location on the tablet. FIG. 4 illustrates that the tablet (210) and the stylus (230) are only coupled though contact (405). When the stylus (230) contacts the tablet (210), the contact sensing surface (220) registers the contact or motion of the stylus according to the touch screen method incorporated. As noted above, the touch screen methods incorporated may include, but are in no way limited to, resistive system methods, capacitive system methods, light emitting diode system methods, or surface acoustic wave system methods. Once registered, the position and/or movement information is collected by the contact sensing surface (220), transmitted to a contact sensing surface interface (415) to be converted into data, and finally transmitted to the local microprocessor (420).

Once the position and/or movement information is collected, the system (400) determines whether the stylus (230) location has changed (step 510; FIG. 5). Change in the stylus location may be determined in a number of different ways. According to one exemplary embodiment, the memory (425) of the tablet (210) sequentially stores data corresponding to the position of the stylus (230). By comparing the most recently stored positional data with the received data, changes in position may be detected. While the present method is described with the local processor (420) determining whether the stylus (230) position or movement has changed, the host processor (440) of the host computer system (250) may also determine position and/or movement of the stylus.

If the tablet (210) determines that there has been no change in the position of the stylus (NO step 510; FIG. 5), the tablet again senses the location of the stylus (230) on the tablet (step 500; FIG. 5). If, however, the tablet (210) determines that there has been a change in the position of the stylus (YES, step 510; FIG. 5), the tablet transmits the new stylus location and/or movement data to the host computer system (250) through the bi-directional bus (step 520; FIG. 5).

When the new stylus (230) location is received by the host computer system (250), it determines whether the new stylus location or movement corresponds to a haptic response (step 530; FIG. 5). According to one exemplary embodiment, a number of conditions may be designated, either by the user or by the host program, as conditions that correspond to a haptic response. For example, movement by the stylus corresponds to movement of the cursor displayed by the host computing device (250). As the cursor is moved over designated displayed objects, a haptic response may be triggered. Exemplary objects that may cause a haptic response when passed over include, but are in no way limited to, subtle defects on a computer aided drafting (CAD) system, various electrical traces on an electrical circuit diagram, etc. Additionally, movement of the stylus (230) (and consequently the cursor displayed on a display device (450)) across a displayed object may warrant a haptic response. For example, if the cursor is caused to translate across a rough surface like cement, a corresponding haptic response may be triggered. Similarly, a haptic response may be triggered if the cursor is caused to translate across a rippled surface, varying stress levels in a CAD drawing, fluid turbulence, grooves, etc.

If the new location and/or translation of the stylus (230) does not correspond to or trigger a haptic response (NO, step 530; FIG. 5), no haptic command is transmitted to the stylus (step 540; FIG. 5). Rather, the system (400) again collects data referring to the stylus location with respect to the tablet (step 500; FIG. 5).

If, however, the new location and/or translation of the stylus (230) does correspond to or trigger a haptic response (YES, step 530; FIG. 5), the host computer system (250) transmits a corresponding haptic command signal to the stylus (step 550). As noted earlier, transmission of commands between the stylus (230) and the host computer system (250) is performed using wireless technologies. Accordingly, when a haptic command signal is to be transmitted to the stylus (230), the host processor (440) first accesses its memory (410) and identifies a signal corresponding to the desired haptic response. This data may be stored in a look up table type data structure. Once accessed, the host processor (440) causes the transmitter (445) to transmit an alternating RF signal to the wireless receiver (300) in the stylus (step 560; FIG. 5).

Once the command signal is received by the wireless receiver (300) of the stylus (230), the signal is transmitted to the CPU (310). When the CPU receives the command signal, it causes the actuator (320) to perform the desired haptic response (step 570). Similar to the look-up table in the host computer system (250), the memory (340) of the stylus (230) includes conversions allowing the CPU to convert the received RF signal into a haptic response signal. When the appropriate haptic response signal is determined, the CPU manipulates the charge provided to the actuator (320) thereby effectuating the desired tactile feedback (step 570).

Any number of haptic sensations may be produced according to the present system and method. According to one exemplary embodiment, a jolt sensation can be output, which is a single impulse of force that quickly rises to the desired magnitude and then is turned off or quickly decays back to zero or an otherwise small magnitude. Similarly, a vibration can be output, which is a time-varying force that is typically periodic, e.g. a force vs. time waveform that is shaped like a sine wave, a triangle wave, or a saw-tooth wave. The vibration of the actuator (320) causes the stylus (230) to oscillate back and forth and can be output by the CPU (310) to simulate a particular effect that is occurring in a host application. A constant force can also be output on the stylus (230). This is a force having a constant magnitude that is output for a specified period of time or until a condition occurs, such as a user-controlled cursor or graphical object being moved to a predefined location in a displayed graphical environment.

Another type of force sensation that can be output by the actuator (320) is a texture force. This type of force is produced by a varying, yet repeating jolt force. By associating the position of the stylus (230) on the tablet (210) to the location of the cursor in the host application, texture bumps may be output to correspond with the surface texture of a displayed object. This type of force is spatially-dependent, i.e. a force is output depending on the sensed position of the stylus (230) as it moves over a designated textured area. For example, when the stylus (230) is positioned between "bumps" of the texture, no force is output, and when the stylus (230) moves over a bump or other extrusion, a force is output by the actuator (320). Other spatial force sensations can also be output.

Moreover, the magnitude of the output forces provided by the actuator (320) can depend on the event or interaction in the graphical environment. For example, the force jolt can be a different magnitude of force depending on the type of graphical object encountered by the cursor. For example, a jolt of higher magnitude can be output when the cursor moves over structural joints in a CAD drawing, while jolts of lower magnitude can be output when the cursor moves over structural stresses. The magnitude of the jolts can also depend on other characteristics of graphical objects, such as varying material designations on a CAD drawing, icons for games as distinguished from icons for business applications, different menu items in a drop-down menu, etc.

Alternative Embodiments

According to one alternative embodiment, the additional output (330) that is coupled to the stylus (230) illustrated in FIG. 4 may include a light or other visual indicator including, but in no way limited to a light emitting diode (LED). According to this alternative embodiment, as the stylus (230) is moved so as to trigger a haptic response, the host computer system (250) transmits a signal to produce a haptic response and/or a visual response in the stylus (230). According to this alternative embodiment, a user or a host application may designate various locations or objects present in the application display as corresponding to visual responses. When the stylus (230) is moved across the surface of the tablet (210) causing the cursor to cross or come into contact with the designated object or location in the host application, the LED or other visual indicator is activated. This alternative embodiment could allow a single trace on an electrical circuit diagram to be designated as corresponding to a visual response, thereby allowing a user to effectively track the single trace through the circuit diagram.

Alternatively, the additional output (330) may include an audio response corresponding to a triggering position or movement. According to this exemplary embodiment, audio responses may be produced by a small speaker that forms a part of the stylus (230). The audio responses may be coordinated with the above-mentioned haptic responses, or they may be independently designated.

In yet another alternative embodiment, an external power connector may be formed in the stylus (230). The external power connector may be used to provide power to the stylus or alternatively recharge a number of rechargeable batteries forming the power supply (360).

Additionally, a replaceable ink-cartridge may be added to the present stylus (230). According to this exemplary embodiment, a replaceable ink-cartridge containing ink of any number of colors may be included in the stylus. Accordingly, the replaceable ink cartridge may be selectively actuated in and out of a functional position when desired by a user. This alternative embodiment allows a single wireless force feedback stylus (230) to function with either a tablet (210) or a paper or other ink receiving medium.

Moreover, the present methods may be incorporated into additional input devices such as a trackball input device. According to this exemplary embodiment, the trackball may provide a number of haptic sensations to a user based on the location of a cursor in a host application. According to this exemplary embodiment, the host application outputs haptic control signals to the trackball in response to the location of the cursor in relation to the haptic host application. According to this alternative embodiment, the haptic control signals, when received by a CPU housed within the trackball, cause the trackball to generate a haptic sensation in the trackball. Haptic sensations may include, but are in no way limited to vibrations caused by an actuator disposed within the trackball housing and/or a selective adjustment of a resistive force imparted upon a trackball giving the user a sensation of increased or decreased viscosity.

In conclusion, the present system and method for providing a wireless force feedback input device generates force sensations that can be output to a user based on signals output from a local microprocessor or host computer. More specifically, a stylus or other well recognized input device may include an actuator, a receiver, and a CPU configured to generate a haptic sensation in response to a received wireless signal. By incorporating the present system and method into a traditional and customary input device such as a stylus, a user's experience and ability are enhanced. The incorporation of wireless communication allows a full range of motion by the user while avoiding awkward and otherwise restrictive mechanical assemblies.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A wireless stylus comprising:
    a housing;
    a central processing unit (CPU) disposed in said housing;
    a wireless communication receiver disposed in said housing and communicatively coupled to said CPU, wherein said wireless communication receiver is configured to receive haptic commands from a host computing device;
    an actuator communicatively coupled to said central processing unit, wherein said actuator is configured to produce a haptic sensation, said haptic sensation being controlled by said CPU in response to said haptic commands; and
    a light emitting device communicatively coupled to said CPU, wherein said light is selectively illuminated in response to said haptic commands.

2. The wireless stylus of claim 1, wherein said housing comprises a cylindrical shape.

3. The wireless stylus of claim 1, wherein said haptic commands from a host computing device are associated with an input signal received by a host application running on said host computing device.

4. The wireless stylus of claim 1, wherein said CPU comprises one of a processor, a microprocessor, or an application-specific integrated circuit (ASIC).

5. The wireless stylus of claim 1, wherein said wireless communication receiver comprises a radio frequency (RF) receiver.

6. The wireless stylus of claim 1, wherein said wireless communication receiver comprises an infrared (I/R) receiver.

7. The wireless stylus of claim 1, further comprising a power supply disposed in said housing;
    wherein said power supply is configured to selectively provide power to said CPU and said actuator.

8. The wireless stylus of claim 7, wherein said power supply comprises a battery.

9. The wireless stylus of claim 8, wherein said battery comprises a rechargeable battery.

10. The wireless stylus of claim 9, further comprising an external power connector disposed on a surface of said housing, wherein said external power connector is configured to provide power to said rechargeable battery when said external power connector is coupled to an outside power source.

11. The wireless stylus of claim 1, wherein said actuator comprises an electromechanical device.

12. The wireless stylus of claim 11, wherein said actuator further comprises one of a linear actuator, a repulsive magnet pair, or a rotary actuator.

13. The wireless stylus of claim 1, further comprising:
a data storage device communicatively coupled to said CPU; and
a clock device communicatively coupled to said CPU.

14. The wireless stylus of claim 13, wherein said data storage device comprises a data lookup table configured to match one of said haptic commands with a corresponding actuator control signal.

15. The wireless stylus of claim 1, wherein said light emitting device comprises a light emitting diode (LED).

16. The wireless stylus of claim 1, further comprising a replaceable ink cartridge disposed in said housing;
wherein said replaceable ink cartridge may be selectively positioned to mark an ink receiving medium.

17. A wireless stylus comprising:
a housing;
a central processing unit (CPU) disposed in said housing;
a wireless communication receiver disposed in said housing and communicatively coupled to said CPU, wherein said wireless communication receiver is configured to receive haptic commands from a host computing device;
an actuator communicatively coupled to said central processing unit, wherein said actuator is configured to produce a haptic sensation, said haptic sensation being controlled by said CPU in response to said haptic commands; and
a speaker disposed on said housing, wherein said speaker is communicatively coupled to said CPU driven by said CPU to produce sounds in response to said haptic commands.

18. The wireless stylus of claim 17, wherein said sound is associated with said haptic sensation.

19. The wireless stylus of claim 17, further comprising a replaceable ink cartridge disposed in said housing;
wherein said replaceable ink cartridge may be selectively positioned to mark an ink receiving medium.

20. The wireless stylus of claim 17, further comprising a light emitting device communicatively coupled to said CPU, wherein said light is configured to he illuminated in response to said haptic commands.

21. The wireless stylus of claim 17, wherein said haptic commands are generated by a host computer and transmitted to said stylus in response to a cursor on a display of said host computer, which is controlled with said stylus, encountering an item displayed on said display of said host computer.

22. A system for providing force feedback to a wireless input device comprising:
a host computing device comprising a display having a cursor;
a data interface configured to be communicatively coupled to said host computing device; and
a data input device configured to input data to said data interface so as to control said cursor on said display;
wherein said data input device includes a housing, a central processing unit (CPU) disposed in said housing, a wireless receiver communicatively coupled to said CPU, and an actuator communicatively coupled to said CPU, wherein said actuator is configured to produce a haptic sensation in response to haptic commands received wirelessly from said host computing device;
wherein said haptic commands are generated by said host computing system and transmitted wirelessly to said data input device in response to said cursor on said display of said host computing device encountering another item displayed on said display of said host computing device;
wherein said data input device comprising a stylus configured to interact with said host feedback application by inputting data into host computing device via said tablet.

23. The system of claim 22, wherein said host computing device and said data interface comprise a single functional unit.

24. The system of claim 22, wherein said host computing device comprises one of a personal computer or a workstation.

25. The system of claim 24, wherein said data interface comprises a tablet.

26. The system of claim 25, wherein said data input device comprises a stylus configured to interact with said host feedback application by inputting data into said host computing device via said tablet.

27. The system of claim 22, wherein said housing comprises a cylindrical shape.

28. The system of claim 22, wherein said wireless transmitter comprises a radio frequency (RF) transmitter and said wireless receiver comprises an RF receiver.

29. The system of claim 22, wherein said wireless transmitter comprises an infrared (I/R) transmitter and said wireless receiver comprises an I/R receiver.

30. The system of claim 22, further comprising a power supply disposed in said housing;
wherein said power supply is configured to selectively provide power to said CPU and said actuator.

31. The system of claim 30, further comprising an external power connector disposed on a surface of said housing, wherein said external power connector is configured to facilitate a recharging of said power supply.

32. The system of claim 22, wherein said actuator comprises an electromechanical device.

33. The system of claim 32, wherein said actuator further comprises one of a linear actuator, a repulsive magnet pair, or a rotary actuator.

34. The system of claim 22, further comprising a light emitting diode (LED) communicatively coupled to said CPU, wherein said LED is configured to illuminate in response to said haptic commands.

35. The system of claim 22, further comprising a speaker disposed on said housing;
wherein said speaker is communicatively coupled to said CPU, and wherein said CPU is configured to selectively cause said speaker to emit a sound.

36. The system of claim 35, wherein said sound is associated with said haptic sensation.

37. The system of claim 22, further comprising a replaceable ink cartridge disposed in said housing;
wherein said replaceable ink cartridge may be selectively positioned to mark an ink receiving medium.

38. A method for producing force feedback in an input device comprising:
receiving location data in a host computer from a user input device;
controlling a cursor on a display of said host computer with said location data from said user input device;

if said cursor controlled in response to said location data intersects another item displayed on said display, generating a haptic command corresponding to said item intersected by said cursor;

transmitting said haptic command corresponding to said item intersected to said user input device;

with an actuator of said user input device, generating haptic sensations in response to said haptic command corresponding to said item intersected by said cursor;

wherein said user input device comprises a stylus, said method further comprising generating said location data by interfacing said stylus with a touch-sensitive interface of said host computer.

39. The method of claim 38, wherein said transmitting is wireless performed with a wireless communication device.

40. The method of claim 38, wherein said user input device comprises a stylus, said method further comprising generating said location data by interfacing said stylus with a. touch-sensitive interface of said host computer.

41. The method of claim 40, wherein said stylus receives said haptic command wirelessly.

42. The method of claim 38, further comprising illuminating light on said user input device in response to said haptic command.

43. The method of claim 38, further comprising emitting sounds with a speaker on said user input device in response to said haptic command.

44. The method of claim 38, wherein said user input device is a stylus, and said method further comprises dispensing ink from said stylus to an ink receiving medium when said stylus is used as a writing instrument.

* * * * *

UNITED STATES PATENT AND TRADEMARK OFFICE
CERTIFICATE OF CORRECTION

PATENT NO. : 7,348,968 B2
APPLICATION NO. : 10/726850
DATED : March 25, 2008
INVENTOR(S) : Thomas Patrick Dawson Page 1 of 1

It is certified that error appears in the above-identified patent and that said Letters Patent is hereby corrected as shown below:

Column 11, Line 48, Claim 20, change "said light is configured to he illuminated" to --said light is configured to be illuminated--

Signed and Sealed this

Seventeenth Day of June, 2008

JON W. DUDAS
*Director of the United States Patent and Trademark Office*